United States Patent [19]

Keys et al.

[11] Patent Number: 4,966,713

[45] Date of Patent: Oct. 30, 1990

[54] PROCESS FOR THE TREATMENT OF WASTE WATER FROM FOOD PROCESSING PLANTS

[75] Inventors: Daniel W. Keys; Grady W. Burgin, both of Gastonia, N.C.

[73] Assignee: FMC Corporation

[21] Appl. No.: 337,630

[22] Filed: Apr. 13, 1989

[51] Int. Cl.$^5$ ................................. C02F 1/54
[52] U.S. Cl. ...................... 210/705; 210/725; 210/730; 210/905; 435/272; 435/946; 426/656; 426/657
[58] Field of Search ............... 210/601, 730, 905, 612, 210/705, 725, 721, 602; 435/946, 272, 803; 530/859; 47/1.4; 426/656, 657

[56] References Cited

U.S. PATENT DOCUMENTS

| | | | |
|---|---|---|---|
| 3,406,114 | 10/1968 | Goren | 210/730 |
| 3,622,510 | 9/1968 | Fellcetta et al. | 210/54 |
| 3,627,680 | 9/1970 | Desbos | 210/52 |
| 3,734,734 | 12/1971 | Halpern et al. | 99/48 |
| 3,763,039 | 10/1973 | Wilson | 210/730 |
| 3,842,003 | 3/1973 | Per Nettli | 210/43 |
| 3,958,364 | 5/1975 | Schenck et al. | 47/1.4 |
| 4,456,532 | 6/1984 | Leslie et al. | 210/602 |
| 4,565,635 | 1/1983 | Le Du et al. | 210/727 |
| 4,693,842 | 9/1987 | Shilo et al. | 210/925 |
| 4,790,943 | 5/1987 | Dunn et al. | 210/705 |

FOREIGN PATENT DOCUMENTS

| | | |
|---|---|---|
| 49-42150 | 4/1974 | Japan . |
| 49-79734 | 7/1974 | Japan . |
| 51-103673 | 9/1976 | Japan . |
| 53-20654 | 2/1978 | Japan . |
| 54-73463 | 6/1979 | Japan . |
| 57-132508 | 8/1982 | Japan . |
| 57-207589 | 12/1982 | Japan . |
| 58-51997 | 3/1983 | Japan . |
| 61-188000 | 8/1986 | Japan . |

OTHER PUBLICATIONS

Takei, "Study on Treatment of Waste Water From Fish Processing Factories With Flocculants II–Flocculant Effects of Marine Algae", *Bull. Tokai Reg. Fish. Res. Lab.* vol. 89, pp. 65–74 (1977).

McComis et al., "Industrial Wastes–Meat, Fish, and Poultry Processing Wastes", *J. WPCF*, vol. 60, No. 6, pp. 868–870 (1988).

FMC Litex A/S Application Bulletin, "Beer Fining" (1988).

FMC Corporation, Marine Colloids Division, "Carrageenan", Monograph No. 1 (1977).

FMC Corporation, Marine Colloids Division, "Water Gelling Applications of Carrageenan", Monograph No. 2 (1981).

FMC Corporation, "Carrageenan Bibliography—Applications and Technology" (1982).

FMC, Marine Colloids, "The Carrageenan People", Introductory Bulletin A-1 (1988).

Pos, "Treatment of Waste Water From Poultry Processing", *The Broiler Industry*, pp. 22–36 (1987).

*Primary Examiner*—Peter Hruskoci
*Assistant Examiner*—Krisanne Shideler

[57] ABSTRACT

In a processing for treating waste containing effluent water from a food processing plant, the effluent water is contacted with a flocculant comprising a crude algal composition or a crude alkali processed algal composition obtained from algae selected from the classes Rhodophyceae, Cyanophyceae, Chlorophyceae and Phaeophyceae, at an acidic pH. A floc, which contains substantially all of the solid waste components of the effluent water, is formed as a result of the treatment process, and can be recovered for use in animal feedstocks or as other products such as fertilizers, or safely disposed of an in landfill operations. The clarified effluent water is sufficiently waste free that it can be forwarded to a secondary treatment facility or back into the food processing plant for reuse in certain plant operations.

31 Claims, No Drawings

PROCESS FOR THE TREATMENT OF WASTE WATER FROM FOOD PROCESSING PLANTS

BACKGROUND OF THE INVENTION

The food processing industry, including the poultry, beef, pork, seafood and vegetable processing segments, is a heavy user of water. In poultry processing, for example, governmental regulations concerning the operation of processing plants require water cooling as a final step before packaging the birds. As a part of this procedure alone, an average size plant may use 50,000 or more gallons of water per day. Large quantities of water are also employed in other aspects of poultry processing. For example, high temperature water is used for washing and scalding the birds prior to defeathering. Water is also used for evisceration and for general clean-up of the plant facilities. Proper and effective treatment of the resulting effluent water from these and other food processing applications is a concern of great economical and environmental significance.

The search for an ecologically sound and cost efficient method for treating such waste water, with its generally high and varied organic solids content, has, however, been a disappointing one. Although a number of different methods have been tried, many of these processes have had significant drawbacks associated with their use.

One method frequently employed by the food processing industry in treating their waste effluent involves the use of metal salts, such as ferric chloride, ferric sulfate and aluminum salts (alum), to initiate the coagulation of suspended solids for eventual removal. However, although the solids found in food processing waste streams, with their high protein, lipid and carbohydrate content, have potential as an inexpensive and highly nutritive feedstock additive, the use of such metals in the treatment process severely limits these applications. Ferric compounds, for example, cause rapid biological deterioration of the solids, including rapid elevation of free fatty acid levels. The metals also cause unsatisfactorily high initial peroxide levels and discoloration of the solids. Moreover, the presence of these metals in processed feedstocks can result in significant health problems in consuming animals, including such afflictions as chick edema or rickets, if ingested in large quantities. Indeed, feedstocks containing solids from metal treated waste water are generally of poor grade, off color, low palatability and poor digestibility. These metals also contribute to a strongly offensive odor in the clarified effluent, and microbial action also remains a problem. Furthermore, environmental concerns abound when land disposal, an alternative to feedstock applications, is considered for metal treated waste solid. If careful landfill precautions are not taken, the metals can leach out and contaminate water supplies. As a result of these and other concerns, governmental disposal requirements of metal treated wastes are becoming more restrictive, and in some instances certain land disposal options have been totally prohibited.

Another commonly used waste treatment process includes the use of synthetic polymers, such as polyacrylamides, as flocculants and/or coagulants for solids removal. However, the presence of synthetic polymers in the resulting solids mass also causes problems in recycling the solids as feedstock additives. The polymers, for example, tend to bind tightly with water, requiring large energy expenditures just to remove sufficient water to meet food grade specifications. Moreover, the glue-like nature of the polymers causes a rapid accumulation of solids in the cooking apparatus during feedstock processing, resulting in serious equipment damage. For these and other reasons, feedstock producers often decline to accept such polymer-based materials. The polymers, with their high water content and low biodegradability, also present environmental concerns, necessitating at times restrictive and even prohibitive governmental policies on the disposal of such solids in landfills.

New and/or better waste treatment processes are needed. The present invention is directed to this end.

SUMMARY OF THE INVENTION

In accordance with one embodiment of the present invention, waste containing effluent water from a food processing plant is contacted, at an acidic pH, with a flocculant comprising a crude algal composition obtained from algae selected from the classes Rhodophyceae, Cyanophyceae, Chlorophyceae and Phaeophyceae and mixtures of two or more thereof.

In a second embodiment, waste containing effluent water from a food processing plant is contacted, at an acidic pH, with a flocculant comprising a crude alkali processed algal composition obtained from algae selected from the classes Rhodophyceae, Cyanophyceae, Chlorophyceae and Phaeophyceae and mixtures of two or more thereof.

Significantly, no metals or synthetic polymers are required in the subject processes. The processes result in a floc formation containing substantially all of the solid waste components of the effluent water. The solids can then be recovered for use in animal feedstocks or as other products, such as fertilizers or safely disposed of in landfill operations, with the effluent water being sufficiently waste free that it can be forwarded to a secondary treatment facility or back into the food processing plant for reuse in certain plant operations.

DETAILED DESCRIPTION OF THE INVENTION

The present invention pertains to processes for treating waste containing water discharged from a food processing plant. The water, referred to herein as effluent water, may be generated by one or more of a variety of food processing tasks, such as washing, cleaning, evisceration, water-cooling, scalding and general plant clean-up. Food processing, as used herein, includes, but is not limited to, the processing of poultry (e.g., chickens, turkeys, ducks and quail), beef, pork, seafood and vegetables, as well as the processing of animal feedstocks or feedstock additives. Preferably, the invention is employed in treating effluent from poultry, beef, pork and seafood processing plants, more preferably effluent from poultry, beef and pork plants. Most preferably, the effluent treated is poultry effluent, particularly effluent from chicken or turkey processing plants.

The particular waste composition of the effluent will, of course, vary depending upon the type of processing plant involved. In a poultry processing plant, for example, the effluent water will contain principally lipids and proteins, consisting of blood, fats and greases (often as emulsions), poultry particles and various microbial species. It may also include components used in cooking and further processing, such as breadings and flavorings.

A number of different types of algae can be utilized as flocculants in the present invention. Such algae include Rhodophyceae (red algae), Cyanophyceae (blue-green algae), Chlorophyceae (green algae) and Phaeophyceae (brown algae), as well as mixtures of two or more thereof. Preferably, the algae employed is Rhodophyceae, Cyanophyceae and/or Chlorophyceae. More preferably, the algae is Rhodophyceae and/or Chlorophyceae, most preferably Rhodophyceae. Although all algae within these classes can be employed, the preferable algae within the class Rhodophyceae includes those of the genus Chondrus (e.g., *C. crispus* and *C. ocellatus*), Eucheuma (e.g., *E. spinosum* and *E. cottonii*), Gigartina (e.g., *G. acicularis, G. pistillata, G. radula* and *G. stellata*), Iridea (e.g., *I. laminariodes, I. capensis* and *I. flaecida*), Gymnogongrus (e.g., *G. norvegicus* and *G. patens*), and Gloiopeltis (e.g., *G. coloformis, G. furcata* and *G. tenax*). Most preferably, the Rhodophyceae algae are selected from those of the genus Chondrus, Eucheuma and Gigartina, particularly those species listed above. Such algae can be harvested in abundant quantities from their natural aquatic/marine environment or, if desired, can be commercially cultivated. Commercial cultivation techniques are well known in the art, and are discussed, for example, in U.S. Pat. No. 2,732,661, and in Carnegie Institution of Washington, Publication No. 600, *Algal Culture from Laboratory to Pilot Plant,* edited by John S. Burlew and published at Washington, D.C. in 1964, the disclosures of both of which are hereby incorporated by reference Because algae of different classes, genus and/or species often grow together and are harvested together, the invention is conveniently practiced with mixed algae.

In one embodiment, the algal flocculant utilized in the present invention is in the form of a crude algal composition. In another embodiment, the algae is in the form of a crude alkali processed algal composition. As used herein, the phrase crude algal composition encompasses raw algae, as well as algae that has been mechanically processed by chopping, dicing, blending, grinding and the like. Preferably, the algae is finely ground to form an algal flour. A preferable flour is one that has a particle size capable of passing through a screen of about 20 mesh (U.S.) or finer, more preferably about 40 mesh (U.S.) or finer, most preferably about 100 mesh (U.S.) or finer. In general, it has been found that the finer mesh sizes are more effective in the subject treatment process in promoting coagulation and flocculation of the solid waste components in the effluent water. As one skilled in the art recognizes, the foregoing U.S. mesh sizes are readily translatable to other sieve designations using, for example, "Standards for Metric Practice", *ASTM,* E-380-79, Table 1, p. 639, the disclosures of which are hereby incorporated by reference. The phrase alkali processed as used herein in conjunction with the phrase crude algal composition, denotes a crude algal composition that has been treated with alkali, such as sodium hydroxide, potassium hydroxide, and the like at elevated temperatures. Preferably, the algae is treated with a 10% solution of potassium hydroxide for about two hours at a temperature of about 140° F., although lower temperatures can be employed with longer heating times. The algae is then rinsed one or more times and used in its raw state, or used after mechanically processing, as described above.

For best results, whether raw algae or mechanically processed algae, alkali treated or not, is used, the algae is first collected and dried using, for example, hot air or sun drying, to approximately 40% moisture. The algae is then stored at a moisture level of about 40% and a temperature ranging from about 50° F. to about 95° F., for about 3 to about 30 days, and then further dried to about 15-20% moisture, prior to use or further processing.

As will be apparent to those skilled in the art, the amount of algae employed will vary according to the particular waste stream characteristics and the desired solids reduction levels, with the precise amounts being readily ascertainable by a skilled artisan. Typically, the algae is initially delivered to the waste stream at relatively low levels, with further additions of algae being made, as needed. Where an algal flour is employed, it is generally mixed first with water, to a concentration of about 0.5% to about 1.0% algae by weight. This concentrate is then added or metered to the waste stream in accordance with need, for example, in the range of 1,000 to 2,000 gallons of the mixture per 1,000,000 gallons of water to be treated. The invention processes can be carried out at ambient effluent temperatures, which often range between about 60° F. and 85° F. Where alkali processed algae is used, however, it is best if the waste stream is at a temperature of at least about 140° F. If necessary, the temperature of the stream can be increased using any number of conventional means that will be apparent to those skilled in the art.

If necessary, an acid is added to the effluent water to reduce the pH of the water to an acidic pH. Preferably, the pH is about 4.0 pH units or less, more preferably in the range of about 2.0 to less than 4.0 pH units, and most preferably in the range of about 3.5 to about 3.8 pH units. The preferred ranges of pH are especially applicable where algae from the classes Rhodophyceae and Phaeophyceae are employed. The pH can be adjusted using, for example, sulfuric acid or other mineral acids, such as nitric, hydrochloric, etc. Organic acids can also be used to lower the pH. Although a pH of less than 2.0 is operative, the process is generally not carried out in this range due to the corrosive nature of effluent at this pH. The particular amount of acid to be employed will be readily ascertainable by one skilled in the art. As a skilled artisan recognizes, use of a strong acid will reduce the quantity of acid required to achieve a desired pH level. The amount of acid employed will also depend, in a continuous system, on the flow rate and, and generally, the initial pH and buffering capacity of the water. The acid may be added before, after or simultaneously with the addition of the algal component. Preferably, however, the acid is added prior to algal addition.

The algae acid and any other reagents may be added to the effluent water at any convenient point. Generally, however, the algae and acid are added to the water following an initial filtering of the effluent water using coarse mesh screens. Such screens serve to remove large waste materials such as, for example, large feather pieces, large portions of meat, and large sections of bone. Such initial coarse screening is conventional in food industry waste treatment processes.

The processes of the present invention produce a floc which comprises substantially all of the solid waste materials in the water. The floc is believed to result from the combined effects of the low pH and the crude algal composition, and is thought to represent both a coagulating (bringing together of finely dispersed solid particles) and a flocculating (an aggregation of the coagulated particles) action. For simplicity of expression, but without intent to limit function, the crude algal composition of the present invention is referred to herein as a flocculant. Surprisingly, the present process is extremely effective in coagulating and flocculating the solid wastes in the water, such wastes including lipids, proteins and/or carbohydrates. The precipitation of some dissolved solids, such as proteins, may also occur in the operation of the present process. Significantly, blood, a particularly difficult waste material to coagulate and flocculate, is coagulated and flocculated effectively and efficiently by the present processes. The present processes also result in significant microbial and odor control in the water and the floc.

If desired, in carrying out the processes of the invention, the effluent may also be contacted with an oxidant. A typical oxidant is chlorine, although other oxidants will provide comparable results. Such oxidants include hydrogen peroxide, chlorine dioxide and ozone. The oxidant assists in breaking down fat and grease emulsions, aids in decoloration of the effluent, and provides additional reduction of microbial agents in the waste water stream. The oxidant may be added in varying amounts, as will be readily apparent to those skilled in the art, depending upon need.

The resulting effluent water and floc can then be separated, with the clarified effluent water being available for secondary waste water treatment processes or for recycling in the cooling or other plant systems, and the floc being suitable for use in feedstock preparation or as a fertilizer. The floc, with its highly biodegradable characteristics, can also be safely disposed of in a landfill operation. Separation of the floc from the effluent water is carried out using various conventional separation techniques, such as simple filtration or centrifugation, or by employing a settling clarifier or a dissolved air flotation unit. Preferably, a dissolved air flotation unit is used to effect separation. The use of dissolved air flotation units to separate solids is well known in the art and is described, for example, in *Dissolved Air Flotation*, Komline-Sanderson Bulletin No. FSB 123-8509, the disclosures of which are incorporated herein by reference. After separation, the floc is generally allowed to drain overnight, in order to remove some of the excess water, prior to further processing or use.

As one skilled in the art would recognize, the process of the invention can be carried out as a continuous or batch process, in a single or multiple chamber or vessel. As noted above, the algae acid and any other reagents may be added to the effluent water at any convenient point, including, for example, prior to the separation stage or in a mixing chamber located in the separation apparatus.

The clarified water, being substantially free of the grease and other solid contaminants, is generally given another pH adjustment prior to further treatment or use. During the coagulation or flocculation process of the subject invention, the water was at an acidic pH, often at a pH of 4.0 pH units or less. For plant reuse or for transmittal to a secondary treatment facility, the pH of the water should typically be almost neutral or slightly alkaline, i.e., a pH of about 6 to about 9 pH units. This readjustment is accomplished by adding a suitable base, such as sodium hydroxide or the like, to the clarified water. U.S. Pat. No. 4,790,943, the disclosures of which are incorporated herein by reference, discusses the reuse of treated effluent water in poultry plant operations. These and other uses of the treated effluent water will be readily apparent to those skilled in the art.

The floc itself can also be productively utilized. Because of its natural characteristics, the floc is readily employed, for example, as inexpensive and highly nutritive feedstock or feedstock additive for animals, fish, crustaceans (such as shrimp), and the like, without concern for, among other things, the induction of health problems such as rickets or edema. The floc can be easily incorporated into such animal feedstocks using standard feedstock rendering procedures. Briefly, the floc is first introduced into conventional feedstock cooking equipment, generally along with other solid food by-products and/or additives, and generally with an addition of hot oil. The material in the cooker is then heated to boiling so that any water contained in the floc and other food by-products or additives is evaporated. Removal of adequate quantities of water is rather easily accomplished using the floc of the present invention. Cooking is then continued until the temperature of the material in the cooker increases substantially beyond the boiling temperature, to a point where the grease and oil present in the materials readily separate from these materials. The cooked materials are then discharged from the cooking equipment without difficulty and introduced into a device designed to press out any oils remaining in the materials. The resulting pressed meal, which is substantially free of oil and water, is then ground to a chosen consistency, and used as a feedstock or feedstock additive, for, an example, livestock animals such as cattle, horses, poultry and the like, or pet animals such as dogs, cats and the like, fresh or salt water fish, and crustaceans such as shrimp and the like. If desired, the extracted oil can also be used as a feedstock additive, or can be further processed through a centrifuge to remove any fine solids and then used in various industries such as the cosmetics industry. As one skilled in the art recognizes, the feedstock rendering operation may be either a continuous or a batch system. Such feedstock rendering processes are conventional, and are described, for example, in I. Mann, *Processing and Utilization of Animal By-Products* (published by The Food and Agricultural Organization of the United Nations, 1962), the disclosures of which are incorporated herein by reference. Surprisingly, floc produced in accordance with the present process, unlike floc produced using many other waste treatment processes, may generally be stored for up to about one to two weeks or so prior to using in such feedstock applications, without significant deterioration in nutritive value and without the odors commonly associated with such deterioration. This short-term storage capability of the subject floc is clearly of great importance to the feedstock industry. The resulting feedstock or feedstock additive is generally of high grade, satisfactory color, high palatability and high digestibility.

The floc can further be employed as a fertilizer or be conveniently disposed of in a landfill. The highly organic and generally biodegradable and nontoxic nature of the floc makes it quite suitable for these uses. When used as a fertilizer, the floc, because of its generally high nitrogen content, will most often be sparsely applied to the area to be fertilized.

The present invention is further described in the following Example. The Example is for illustration only and should not be construed as limiting the scope of the appended Claims.

EXAMPLE

Initial water samples were taken from a typical continuous poultry effluent waste stream at various intervals over a period of about three days. The temperature of the stream during this time averaged about 80° F.

Downstream from the initial sample point, sulfuric acid was added, using a metering device, in an amount sufficient to adjust the pH of the stream to about 3.8 pH units. Algal flour obtained from the species *Gigartina radula* and having a particle size capable of passing through a screen of about 20 mesh (Marine Colloids Division, FMC Corporation, Rockland, Maine) was mixed with water to a concentration of about 1.0% algae by weight. The concentrate was then added to the effluent water at a rate of about 2,000 gallons of concentrate per 1,000,000 gallons of effluent water, using a metering device. The effluent water was routed through a typical dissolved air flotation unit, and samples of the resultant clarified water and separated solids (floc) were taken at various intervals during this three-day time period.

As a result of the acid and algal treatment, the measured reduction in chemical oxygen demand of the water averaged about 78% and the total reduction in suspended solids averaged about 86%. Fats, oils and greases were reduced an average of about 87% percent. A marked reduction in the odors normally associated with poultry waste water was also observed. The clarified effluent was then discharged to a secondary treatment facility, following pH adjustment to a neutral range using sodium hydroxide, with no adverse effects to the secondary treatment process being observed.

The floc removed from the processed water was stored overnight at ambient temperature to allow free water to drain off. The solids content of the drained floc was measured and found to be routinely about 30% dry solids by weight or greater. The drained solids were then processed in a standard poultry by-products rendering plant using, on one occasion, 75% floc and 25% other food by-products, and, on another occasion, 100% floc. Protein levels of the processed feedstock were measured and found to fall within the normal range of poultry by-product meal. The oils extracted in the course of the rendering process were analyzed and found to be within the acceptable profile for oils useful in feedstock applications. No difficulties were encountered in the feedstock processing of the floc material.

Various modifications of the invention in addition to those shown and described herein will be apparent to those skilled in the art from the foregoing description. Such modifications are also intended to fall within the scope of the appended Claims.

What is claimed is:

1. A process for the treatment of solid waste containing effluent water from a food processing plant, comprising contacting the effluent water with a flocculant comprising a crude algal composition obtained from algae selected from the classes Rhodophyceae, Cyanophyceae, Chlorophyceae, Phaeophyceae, and mixtures of two or more thereof, at an acidic pH, whereby a floc is formed containing substantially all of the solid waste components of the effluent water.

2. A process of claim 1 wherein the algae is from the class Rhodophyceae.

3. A process of claim 2 wherein the algae is selected from the genus Eucheuma, Chondrus, Gigartina, Iridea, Gymnogongrus, Gloiopeltis, and mixtures of two or more thereof.

4. A process of claim 3 wherein the algae is selected from the species *Eucheuma spinosum, Eucheuma cottonii, Chondrus crispus, Chondrus ocellatus, Gigartina acicularis, Gigartina pistillata, Gigartina radula, Gigartina stellata*, and mixtures of two or more thereof.

5. The process of claim 1 wherein the crude algal composition is an algal flour having a particle size capable of passing through a screen of about 20 mesh or finer.

6. The process of claim 5 wherein the algal flour has a particle size capable of passing through a screen of about 40 mesh or finer.

7. The process of claim 1 wherein the pH is about 4.0 pH units or less.

8. The process of claim 7 wherein the pH is in the range of about 2.0 to less than 4.0 pH units.

9. The process of claim 1 wherein acid is added to the effluent water prior to the crude algal composition to provide the acidic pH.

10. The process of claim 1 further comprising adding an oxidizing agent to the waste containing effluent water.

11. The process of claim 1 wherein the food processing plant is selected from the group consisting of poultry, beef, pork, seafood and vegetable processing plants.

12. The process of claim 11 wherein the food processing plant is a poultry processing plant.

13. The process of claim 12 wherein the poultry processing plant is selected from the group consisting of chicken and turkey processing plants.

14. The process of claim 1 wherein the algal composition is an algal flour having a particle size capable of passing through a screen of about 20 mesh or finer, the algae is from the class Rhodophyceae, the pH is in the range of about 2.0 to less than 4.0 pH units, and the food processing plant is a poultry processing plant.

15. The process of claim 14 further comprising separating the floc from the effluent water.

16. The process of claim 15 wherein the separation out in a dissolved air flotation unit.

17. The process of claim 15 further comprising rendering the floc to a form suitable for use as an animal feedstock.

18. The floc produced by the process of claim 17.

19. The floc produced by the process of claim 15.

20. The process of claim 1 further comprising separating the floc from the effluent water.

21. The process of claim 20 wherein the separation step is carried out in a dissolved air flotation unit.

22. The process of claim 20 further comprising rendering the separated floc to a form suitable for use as an animal feedstock.

23. The floc produced by the process of claim 22.

24. The floc produced by the process of claim 20.

25. A process for the treatment of solid waste containing effluent water from a food processing plant, comprising contacting the effluent water with a flocculant comprising a crude alkali processed algal composition obtained from algae selected from the classes Rhodophyceae, Cyanophyceae, Chlorophyceae and Phaeophyceae, and mixtures of two or more thereof, at an acidic pH, whereby a floc is formed containing substantially all of the solid waste components of the effluent water.

26. The process of claim 25 wherein the algae is from the class Rhodophyceae.

27. The process of claim 25 wherein the temperature of the effluent water is at least about 140° F.

28. The process of claim 25 further comprising separating the floc from the effluent water.

29. The process of claim 28 further comprising rendering the separated floc to a form suitable for use as an animal feedstock.

30. The floc produced by the process of claim 29.

31. The floc produced by the process of claim 28.

* * * * *